United States Patent [19]
Copeland et al.

[11] 3,821,065
[45] June 28, 1974

[54] FOAM-FIBROUS PAD

[75] Inventors: Richard S. Copeland, Grand Rapids; Frederick D. Peters, Comstock Park, both of Mich.

[73] Assignee: Sackner Products, Inc., Grand Rapids, Mich.

[22] Filed: Apr. 6, 1972

[21] Appl. No.: 243,279

[52] U.S. Cl............. 161/67, 161/81, 161/154, 161/159, 156/72, 156/148
[51] Int. Cl............. B32b 5/06, B32b 5/18
[58] Field of Search............ 161/62, 65, 64, 67, 53, 161/151, 154, 160, 81, 159; 156/91, 148, 276; 28/72.2; 264/321

[56] References Cited
UNITED STATES PATENTS

| | | | |
|---|---|---|---|
| 3,122,141 | 2/1964 | Crowe | 156/148 X |
| 3,227,603 | 1/1966 | Kraiman | 161/160 |
| 3,341,640 | 9/1967 | Rosencrantz | 264/321 X |
| 3,344,222 | 9/1967 | Shapiro et al | 264/321 |
| 3,591,444 | 7/1971 | Hoppe | 161/53 |
| 3,600,261 | 8/1971 | Kerres | 161/81 X |
| 3,650,867 | 3/1972 | Bauer | 161/160 X |
| 3,661,691 | 5/1972 | Slosberg | 161/67 |
| 3,686,046 | 8/1972 | Crowley | 156/148 X |

*Primary Examiner*—William J. Van Balen
*Attorney, Agent, or Firm*—Price, Heneveld, Huizenga & Cooper

[57] ABSTRACT

A foam-fibrous pad and method for making the same, the pad comprising a layer of fabric sheeting, a layer of fibers and a layer of foam. The fibers are needled into the sheeting to form composite backing and the fiber side of the composite backing is then sprayed or otherwise coated with a fine coating of heat-sensitive, pressure sensitive, contact sensitive, adhesive or any other adhesive with a controlled degree of adhesion. The foam layer is combined with the adhesive-sprayed or coated fiber side of the composite backing to form the complete pad while overfeeding the foam and simultaneously needling the composite to the foam. The overfeeding produces a curvature away from the foam layer which facilitates application of the pad to small radius curves. The final step is to partially adhere the foam to the backing by means of the adhesive with heat or other means depending on the type of adhesive used, thereby permanently bonding the several layers in their curved state.

9 Claims, 6 Drawing Figures

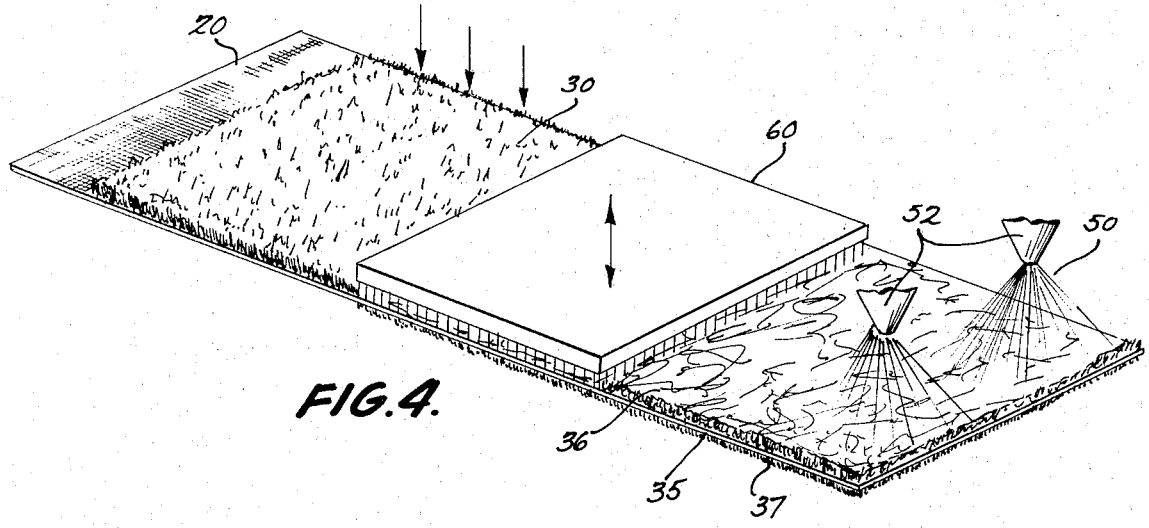
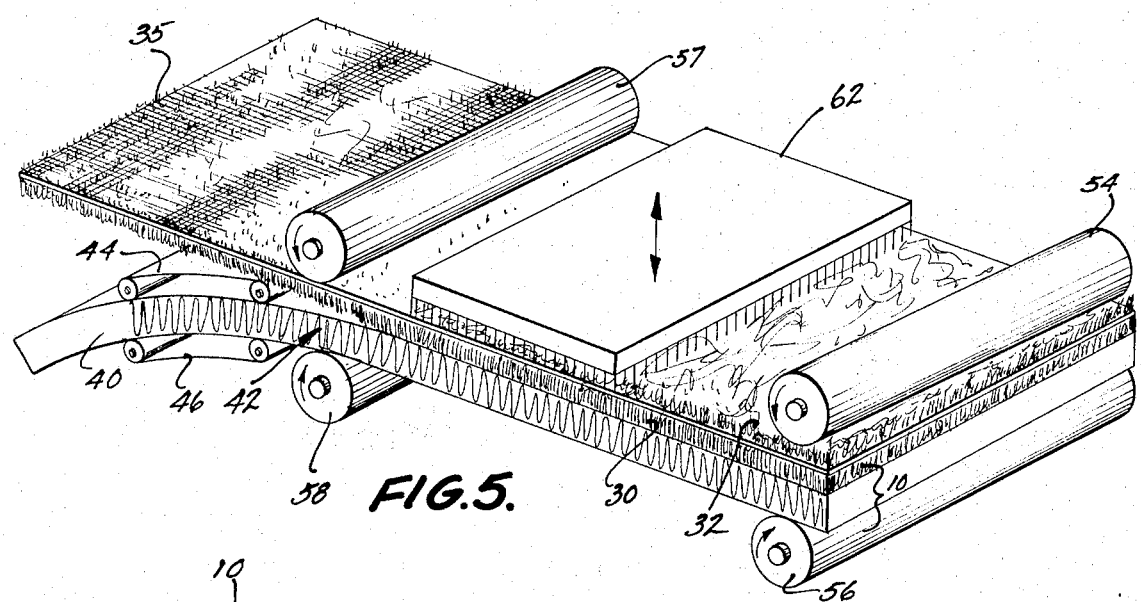
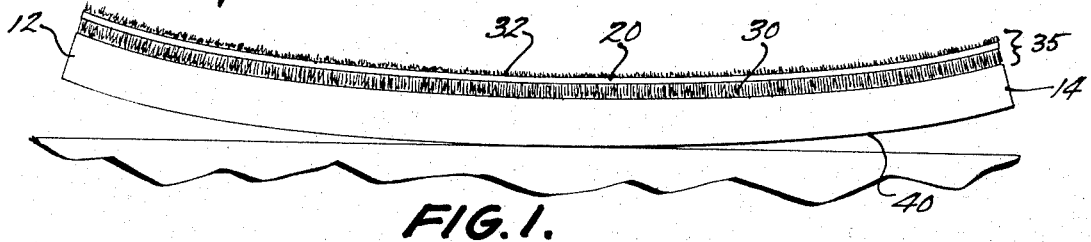

FOAM-FIBROUS PAD

This invention relates to foam-fibrous pads and a method for making such foam-fibrous pads and, more particularly, to foam-fibrous pads and a method for making such pads for use in the padding of seating and other applications where the padding must be bent around small radius curves, be susceptible of separation of the foam from the remainder of the pad, and can be smoothly covered by an exterior layer of durable material embossed thereon.

BACKGROUND OF THE INVENTION

Pads and padding for use in vehicles and in other applications where the pad for seats, dashboards, and the like are covered by an exterior layer of material are very well-known. In the past, such pads have been produced by laminating various layers of fabric sheeting, fibers and/or foamed material to produce a resilient laminant which will allow some compression and yet will return to its normal expanded state when the compressing force is removed. Particularly in the automobile industry, such pads are required to be fitted around small radius curves and to allow the separation of sections of the layer of foam material from the remaining backing layers such that the exterior cover material may be embossed or bonded directly to the backing layers of fiber and fabric sheeting to produce decorative designs.

Previously known laminated pads have utilized a substantial amount of glue applied directly to the fabric sheeting for the attachment of the fibers to the sheeting. However, the application of such a substantial layer of glue stiffened the fabric backing such that when the completed pad was applied around a small radius curve, the backing wrinkled, causing an unsightly unevenness around the curve in the completed product. Further, the previously known pads were generally distorted against the intended bending direction and had no curvature formed integrally in them to facilitate the bending of the pad around curves. Additionally, previously known pads have laminated the foam to the fiber and fabric backing layers with another layer of glue applied to the fibers. Such a layer of glue in addition to further stiffening the completed pad, securely held the layer of foam to the fabric and fiber backing, but prevented the removal of the layer of foam in certain areas when decorative designs, formed by embossing covering material to such areas, as described above, were desired. In such pads, when the removal of the foam was attempted, the glue held the foam so securely to the fabric and fiber backing layers that the foam itself separated, leaving portions of the foam still attached to the fabric and fiber backing sheet. Thus, the remaining areas of foam still attached to the fabric and fiber backing prevented the smooth application of the exterior cover in such areas.

Therefore, the need was apparent for a foam-fibrous pad which could be applied around small radius curves without wrinkling, which had its several laminations securely bonded together such that the resulting pad would be durable and would not have undesirable separations in the laminations, and yet, which was susceptible of having the layer of foam easily removed in desired areas in order to allow the proper application of the exterior covering material to form decorative designs.

SUMMARY OF THE INVENTION

Accordingly, it is an object and feature of the present novel invention to provide a foam-fibrous pad which may be applied around small radius curves without any undesirable wrinkling in the backing sheet.

It is another object and feature of the present invention to provide a foam-fibrous pad which is formed selectively with an equalized flatness or a slight permanent curvature away from the foamed layer or lamination in order to facilitate the application of the pad around curves in certain applications.

It is a further object and feature of the present invention to provide a foam-fibrous pad which pad has the foamed layer securely bonded to the fiber and fabric backing and yet which is susceptible of the easy removal of the foamed layer in desired areas without leaving portions of the foam still attached to the fiber and fabric backing.

The objects and features of the present invention may be accomplished by providing a foam-fibrous pad and method for making same comprising a layer of fabric sheeting, a layer of fibers, and a layer of foam. The fibers are first dropped onto the fabric sheeting and then needled into the sheeting to form a composite backing having a fiber side and a sheeting side. Next, a fine coating of adhesive is applied to the fiber side of the composite backing after which the composite is combined with the layer of foam to form the foam-fibrous pad using a special procedure. When the composite and foam are combined, the layer of foam is overfed, i.e., fed at a speed greater than that at which the composite backing is fed, while simultaneously the composite is needled to the overfed layer of foam. Following the needling of the composite to the overfed foam to form the pad, the fine coating of adhesive is activated by heating or other means dependent on the type of adhesive used, thereby causing the composite backing to be partially adhered to the foam. The resulting pad selectively has an equalized flatness or includes a permanent curvature away from the foam side and toward the composite side of the pad depending on the speed of the overfeeding operation. The pad also has an exactly balanced adhesion of the layer of foam to the composite backing such that the foam is normally securely bonded to the composite backing and yet is susceptible of complete and easy removal in certain areas when desired.

These and other objects, advantages and features of invention will become apparent from a study of the following description taken in conjunction with the drawings.

BRIEF DESCRIPTION OF THE DRAWINGS

FIG. 1 is a side elevation of the completed foam-fibrous pad showing the permanent curvature away from the foam layer;

FIG. 4 is a schematic perspective view showing the placing of the fibers on the fabric sheeting, the needling of the fibers to the fabric sheeting, and the spraying of the adhesive coating on the fibers;

FIG. 5 is a schematic perspective view of the combining of the composite fiber and fabric sheeting with the overfed layer of foam followed by the needling of the composite to the foam to form the pad.

DESCRIPTION OF THE PREFERRED EMBODIMENT

Figure 2:
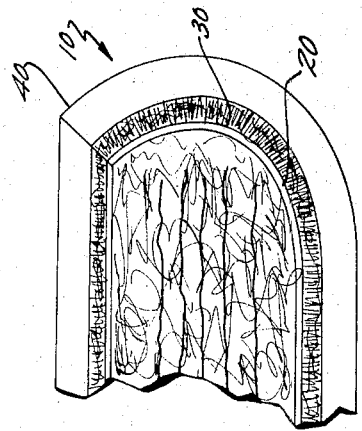
FIG. 2 is a perspective view of the completed foam-fibrous pad bent around a small radius curve.

Referring now to the drawings in greater detail, FIG. 1 shows the completed foam-fibrous pad 10 including the permanent curvature formed therein. The foam-fibrous pad 10 comprises a layer of fabric sheeting 20, a layer of fibers 30, and a layer of foamed material 40. Although the foam-fibrous pad may be produced in any length or width, whenever the pad is cut into lengths such as that shown in FIG. 1, the end portions 12 and 14 will curve upwardly if the pad is resting on a flat surface. As is apparent from FIG. 1, this permanent curvature is away from the layer of foamed material such that the layer of foamed material is on the outside of the radius of curvature. As will be more fully described below, the permanent curvature formed in pad 10 greatly facilitates the bending of the pad when applied to small radius curves in seating applications such as in automobiles and other vehicles. Additionally, the pad 10 may be formed with an equalized flatness such that in the complete laminated pad the length of the foamed layer exactly equals the length of the layers of the fabric sheeting and fibers. The equalized flatness also allows the pad to be bent around small radius curves with only minimal distorsion.

The layer of fabric sheeting 20 is sheeting which may be woven from materials selected from a group including cotton, nylon, rayon, polyester, polypropylene, and mixtures and combinations of these materials. It has been found that the weight of the fabric sheeting which will produce the best results is between one-half and 6 ounces per square yard of sheeting. The sheeting is woven fairly tightly, but yet it is sufficiently loose to allow fibers to be needled into it.

The layer of fibers 30 is a layer of fibers dropped in a random or other orientation on the fabric sheeting 20 during the manufacture of the foam-fibrous pad 10. A suitable thickness of the layers of fibers 30 has been found to be approximately 1/8 inch. The fibers themselves are formed from materials such as rayon, nylon, polyester, acetate, polypropylene, wool, cotton, spandex, and mixtures of these various materials. The fibers are flexible and resilient, and when combined with the layer of fabric sheeting by means of the needling process, form a composite backing of fibers and fabrics which is itself resilient and flexible and stabilizes the layer of foam 40 added later to complete the foam-fibrous pad 10.

The layer of foam material 40 may be formed from any of several suitable foam materials such as polyester urethane foam, polyether urethane foam, or a polyvinyl chloride foam. The layer of foam 40 is actually a sheet of foam material having a thickness of approximately three-eighths inch and is combined with the composite backing by means of needling and bonding with an adhesive as will be more fully described below.

A fine coating of heat activated, pressure sensitive, contact sensitive or other controlled adhesion adhesive or resin 50, shown being applied in FIG. 4, is applied to the fiber side 36 of the composite backing 35 of fiber and fabric sheeting prior to the combination of the composite backing with the layer of foam material 40. Suitable adhesives or resins include polymers and copolymers of vinyl chloride, vinyl acetate, acrylates, polyethylene, polypropylene, Buna N and Buna S. Normally, as shown in FIG. 4, a fine coating of the adhesive is sprayed or otherwise applied on the fibers after they are needled into the fabric sheeting 20, and prior to the combination of the composite backing 35 with the layer of foam material 40. The adhesive, if sprayed on wet, is then dried on the composite backing and is later activated by the application of heat, pressure, or other means in order to help secure the layer of foam material 40 to the composite backing 35. The application of the adhesive 50 to the fibers 30 increases the stiffness, roughness, abrasiveness, and adhesiveness or bonding qualities of the fibers and thereby increases their ability to hold or retain when they are needled into the layer of foam material 40 during the production operation. However, the fibers are not so stiff or rough as to prevent the separation of the foamed layer from the composite backing later when desired. These desirable fiber qualities are obtained by a limited and controlled application of adhesive to the fibers. The controlled application limits the penetration of the adhesive into the foam layer when the composite backing is combined therewith. Although the adhesive will normally be applied when wet and later dried, it is contemplated that an adhesive that is dry when sprayed on or otherwise applied may be used. Additionally, it is contemplated that pressure sensitive and other adhesives activated by other means may also be used.

As shown in FIG. 2, the foam-fibrous pad 10 may be easily and smoothly bent around small radius curves in seating and other padding applications. As depicted therein, the foam-fibrous pad 10, when bent around a small radius curve, will not have any buckles or wrinkles of any significant size in the fabric backing sheet 20. This is unlike any of the previously known pads which were quite stiff. When those pads were bent they would bend slightly and then abruptly buckle or warp into several small, straight sections around the circumference of the curve, thereby preventing the smooth application of the pad to the curve. However, with the present inventive foam-fibrous pad 10, only a few small and barely noticeable creases will develop in the fabric backing sheet 20, even when bent around an extremely small radius. This effect results from the permanent curvature or equalized flatness formed in the foam-fibrous pad 10 as described above, and the absence of any sizeable amount of adhesive saturating, and thereby stiffening, the fabric sheeting 20. Additionally, in the completed pad 10, the stiffest and most rigid member, i.e., the fabric sheeting is embedded within the fibers by means of the needling of the fibers through the sheeting and into the foam. This needling draws fibers onto both sides of the fabric sheeting thereby embedding the sheeting within the fibers. Additionally, the completed pad bends around the small curves more easily since the majority of the adhesive, as coated on the fibers, is disposed internally within the pad and not on its exterior surfaces.

Figure 3:
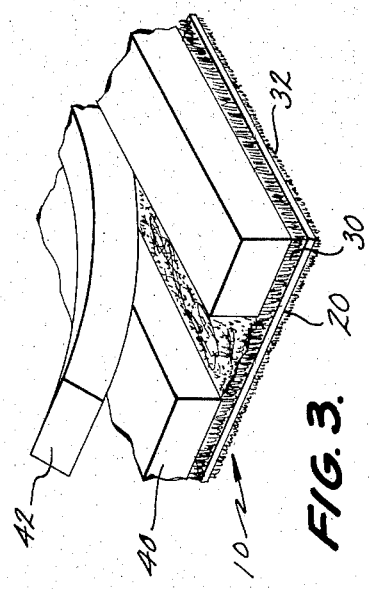
FIG. 3 is a perspective view of the completed foam-fibrous pad showing the removal of a portion of the foam layer from the composite fiber and fabric sheeting.

Another important quality of the foam-fibrous pad 10 is shown in FIG. 3. As depicted therein, the layer of foamed material 40 may be cut or scored with a knife edge, or other tool, forming a portion 42 which may be removed from the foam-fibrous pad 10. The portion 42 may be easily separated and removed from the pad 10 due to an exactly balanced adhesion produced by a combination of the bonding action of the adhesive 50 and the embedding of the fibers 30 in the layer of foam material 40 by the needling process. Thus, if the layer of foam material 40 were securely glued to the fibers as in previously known pads, the portion 42 could not be easily removed since it would be tightly bonded to the fibers, and any separation would either leave chunks or portions of the foam still attached to the fibers 30 or pull the fibers 30 away from the fabric sheeting. On the other hand, if the fibers 30 were merely needled into the layer of foam material 40 without any adhesive at all, the portion 42, and indeed the entire layer of foam material 40, could be easily removed with hardly any efforts at all, and the resulting pad would have none of the durability required for seating applications. However, the combination of needling the fibers 30 into the layer of foam material 40 and the partial surface adhesion of the foam material 40 to the layer of fibers 30 by means of the adhesive or resin 50 and the application of heat or other means depending on the type of adhesive used, produces a proper balance of holding or retaining power, thereby insuring a durable and stable lamination of the various layers, and yet allowing the separation of portions such as portion 42 from the foam-fibrous pad 10 when desired.

DESCRIPTION OF THE METHOD

The present novel foam-fibrous pad including the features described above may be produced by following the steps now described. As shown in FIG. 4, a mass of fibers, randomly or otherwise oriented, is dropped or placed on the layer of fabric sheeting 20 forming a layer of fibers 30 approximately 1/8 inch in thickness. Following the placing of the layer of fibers 30 on the fabric sheeting 20, the fibers are needled into the fabric sheeting by means of a reciprocating needling apparatus 60 which is schematically shown. This needling process, which has been described in other United States patents such as U.S. Pat. No. 3,354,020, securely embeds a portion of the randomly oriented fibers in and between the threads of the fabric sheeting 20. The result is a composite backing 35 having a side on which the layer of fibers is attached or a fiber side 36 and a sheeting side 37. Sheeting side 37 has some fibers thereon which are drawn therethrough by the needling process.

Following the formation of the composite backing 35, the primary fiber side 36 of the composite backing 35, including the majority of the fibers, is sprayed or otherwise coated with a fine coating of adhesive 50, for example, by means of spraying nozzles 52 schematically shown in FIG. 4. As described above, the spraying of the fibers with the adhesive 50 applies a coating of adhesive to the fibers and causes them to attain more desirable bonding or adhering qualities, therein increasing their ability to retain the layer of foam material 40 to be combined with the composite backing 35 in the next step of the method. If the adhesive 50 is applied in a wet state or condition, it should be dried thoroughly before the composite backing 35 is combined with the layer of foam material 40. However, if a dry adhesive is applied on the composite backing 35, then no drying step is necessary.

Following the coating or spraying of the fiber side 36 of the composite backing 35, the special procedure or step which imparts the permanent curvature or the equalized flatness to the foam-fibrous pad 10 described above is performed. This important and novel step is depicted in FIG. 5 and comprises the combining of the composite backing 35 with the layer of foam material 40 while precisely controlling the internal forces within the layer of foam material 40.

Generally, the process of combining the layer of foam material 40 with the composite backing 35 comprises pulling the layer of foam 40 into contact with the adhesive-sprayed or coated fiber side 36 of the composite backing 35 by means of driven or pulling rollers 54 and 56 while the respective layers are guided by guide rollers 57 and 58. Prior methods of manufacturing pads have stretched the foam layer during this pulling and combining operation such that, after the pad was formed and permitted to relax, the stretched foam layer contracted or shrank back to its normal or original configuration. Since the foam layer had been fastened to some type of backing in its stretched state, the contraction or shrinking imparted a "negative" curvature to the pad, i.e., toward the foam in the completed pad. The resulting pad would greatly distort when bent around small radius curves with the foam on the outside of the radius, as described above. The present novel method, however, utilizes a unique process of carefully controlling the amount or degree and direction of internal forces within the foam layer 40 during the combination process in order to predetermine the curvature in the completed pad 10.

In the present method, the foam layer 40 and the adhesive coated fiber side 36 of composite backing 35 are pulled together as above, but, in addition, the foam layer is fed under controlled conditions with belt means 44 and 46 such that the internal forces within the foam 40 are either neutral or compressive forces depending on the speed at which the belt means are feeding. Thus, in the former case, the foam layer has balanced or neutralized internal forces which, after combination with the backing 35 in the above manner, results in a pad having an equalized flatness. Such a flat pad is easily bent around small radius curves with only minimal distortion.

Similarly, in the latter case above, the speed of the belt means 44 and 46 is controllable to feed the foam layer 40 at a speed greater than the speed at which the foam and backing are being pulled through rollers 54 and 56. This feeding at an increased speed may be termed "overfeeding" and is controlled so that the foam does not buckle or warp during feeding, but is slightly longitudinally compressed, as shown at 42 in FIG. 5. Consequently, after the composite backing is needled into the slightly longitudinally compressed, overfed foam by means of a second needling apparatus 62, and the composite pad is allowed to relax, the foam side of the now foam-fibrous pad 10 will increase in length with respect to the remainder of the pad 10, resulting in a completed pad 10 having a permanent, built-in or "positive" curvature away from foam layer 40. The increase in length of the foam is proportional to the speed of overfeeding, or feeding by belt means 44 and 46. The overfeeding speed is variable; a lesser speed produces a lesser "positive" curvature in the completed pad and vice versa. Such a positive curvature toward the foam 40 greatly facilitates the bending of the pad around small radius curves with only minimal distortion when the foam layer is on the outside of the radius. As is apparent, such a pad is advantageous for seating purposes, such as in automobiles, where the foam is on the outer radius of many curves and must often be embossed with another layer of material such as vinyl.

The feeding operation with belt means 44 and 46 thus produces a pad with an equalized flatness or a permanent curvature away from the foam, either of which is easily bent around small radius curves with minimal distortion. The internal forces in the foam when the pad is manufactured will thus be understood to be either respectively neutral (for flat pad) or compressive (causing a positively curved pad) depending on the speed of the feeding operation.

The needling of the composite backing 35 to the layer of foam material 40 also causes some of the fibers 30 to be pulled through the fabric sheeting 20 causing some of the fibers to remain on the sheeting side 37 of the composite backing 35 thereby producing secondary layer of fibers 32. Thus, after the second needling operation, the outside surfaces of the foam-fibrous pad 10 will include a layer of foam material 40 on one side and a layer of fabric sheeting 20 covered randomly with the secondary layer of fibers 32 pulled through the fabric sheeting 20 by the second needling operation.

The final step of the method is the actuation of the adhesive 50 by heating or otherwise on pad 10 to partially fuse or adhere the layer of foam material 40 to the layer of fibers 30. This heating, which may be properly accomplished within the typical range of temperatures between about 100°F. and 450°F., is sufficient to bond the foam material 40 to the fibers 30 without completely breaking down and melting the fibers 30 and the fabric sheeting 20. The actual temperature used is dependent upon the type of adhesive or resin used and the above typical range of temperatures is only exemplary and is not intended to limit the type of adhesive or resin used. As mentioned above, pressure or contact sensitive adhesives may also be used.

Figure 6:
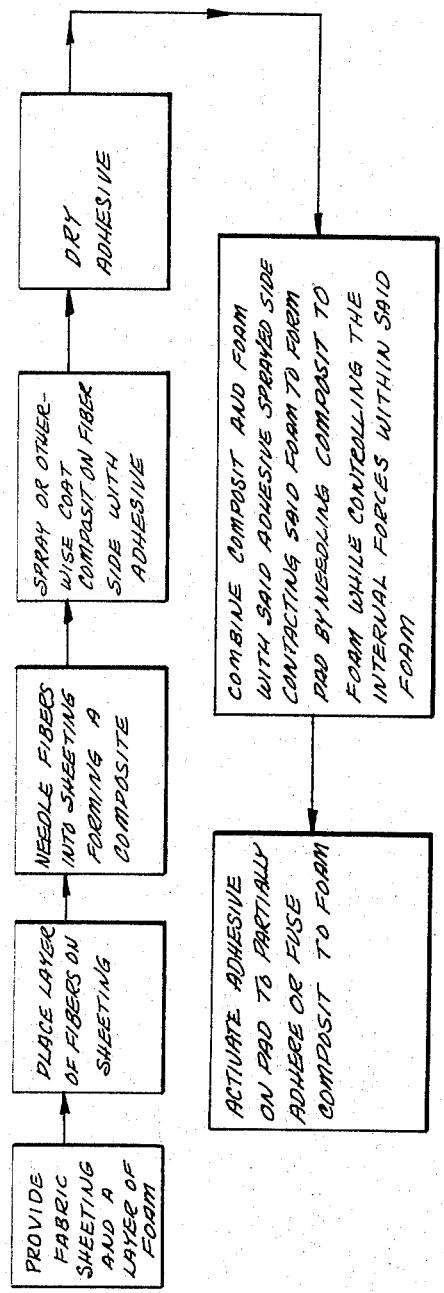
FIG. 6 is a schematic, flow diagram of the process for forming the completed, foam-fibrous pad having the permanent curvature formed therein.

The process may be summarized as shown in FIG. 6. The foam-fibrous pad 10 is formed by providing a layer of fabric sheeting 20 and a layer of foam material 40. A layer of fibers 30 is placed or dropped on the fabric sheeting 20 and the fibers are then needled into the fabric sheeting, forming a composite backing 35 for the foam material 40. Following the needling of the fibers into the fabric sheeting, a fine coating of controlled adhesion adhesive 50 is applied or sprayed on the fiber side 36 of the composite backing 35. If the adhesive 50 was sprayed on when wet, the adhesive may be dried before the next step although the drying step is not necessarily essential to the invention. However, if the adhesive 50 was dry when sprayed on, no drying step is needed.

Following the application of the adhesive 50 to the fiber side 36 of the composite backing 35, the layer of foam material 40 is combined with the adhesive-sprayed or coated fiber side of the composite backing 35 while the foam material is being overfed, thereby forming the foam-fibrous pad 10. As stated above, the overfeeding process comprises the feeding of the foam material at a speed which is greater than the speed at which composite backing is being fed. The overfeeding of the foam material 40 causes a slight compression of the foam material, and while the foam material is still in the slightly compressed state, the composite backing 35 is needled into the foam material. The foam material then expands resulting in the equalized flatness or permanent curvature of the foam-fibrous pad as described above. The final step of the method is the actuation of the adhesive 50, for example, by the application of heat which partially fuses the foam material 40 to the fibers 30, thereby permanently bonding the several layers of the foam-fibrous pad in their curved state.

The foam-fibrous pad 10 produced with the above method has the features and advantages described above including the ability to be bent around small radius curves in automobile and other seating applications without any buckling or wrinkling of the fabric sheeting, and the quality of allowing the foam material layer 40 to be separated from the composite backing 35 without leaving any portions of the foam attached to the composite backing. Thus, the padding 10 may be applied smoothly to small radius curves, and have external covering material embossed or bonded to it, smoothly and evenly and without any unsightly protrusions, in the areas where the foam material is removed from the composite backing 35.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A foam-fibrous laminated pad comprising fabric sheeting, fibers, a sheet of foam, and an adhesive, said fibers being evenly distributed on and needled into said sheeting forming a composite backing having a fiber side including a majority of said fibers and a sheeting side including a minority of said fibers, said adhesive being located at the said fiber side of said composite and on said fibers, said composite being needled to said layer of foam with said fiber side immediately adjacent said foam and with said fibers with adhesive thereon needled into said foam whereby the lamination of said composite to said foam is formed of the combination of the needling of said fibers into said foam and the adhesion of said foam to said composite by said adhesive on said fibers in and against said foam.

2. A foam-fibrous pad as described in claim 1 wherein said foam includes no internal forces whereby said pad is flat.

3. A foam-fibrous pad as described in claim 1 wherein said foam is under longitudinal compression whereby said pad includes a permanent curvature away from said foam side and toward said composite side.

4. A foam-fibrous pad in accordance with claim 1 wherein said fabric sheeting is formed from a material in the group including cotton, nylon, rayon, polyester, polypropylene, and mixtures and blends thereof, such sheeting having a weight between about 1½ and 6 ounces per square yard.

5. A foam-fibrous pad in accordance with claim 1 wherein said fibers are randomly oriented.

6. A foam-fibrous pad in accordance with claim 5 wherein said fibers are formed from a material in the group including wool, cotton, rayon, nylon, polyester, polypropylene, acetate, spandex and mixtures and combinations thereof.

7. A foam-fibrous pad in accordance with claim 1 wherein said foam is formed from a material in the group including polyester urethane foam, polyether urethane foam, and polyvinyl chloride foam.

8. A foam-fibrous pad in accordance with claim 1 wherein adhesive is selected from the group including polymers and copolymers of vinyl chloride, vinyl acetate, acrylate, polyethlene and polypropylene.

9. A foam-fibrous pad comprising a first lamina having a first length and including the composite of a plurality of fibers and bendable support means therefor; a second lamina having a length greater than said first length and including a sheet of compressible foam; said first lamina being generally parallel to and secured to said second lamina with the fibers of said first lamina being secured to said foam and with the ends of said foam being generally coterminous with the ends of said first lamina; said foam sheet compressed along its length when said pad is held flat, said foam sheet being expandable when said pad is relaxed to cause said pad to include a curvature away from said foam sheet.

* * * * *